Jan. 19, 1960
A. LO CELSO ET AL
2,922,077
PHOTOELECTRIC DEVICES FOR SWITCHING THE
DAZZLING HEADLIGHTS OF MOTOR-VEHICLES
Filed Dec. 7, 1956
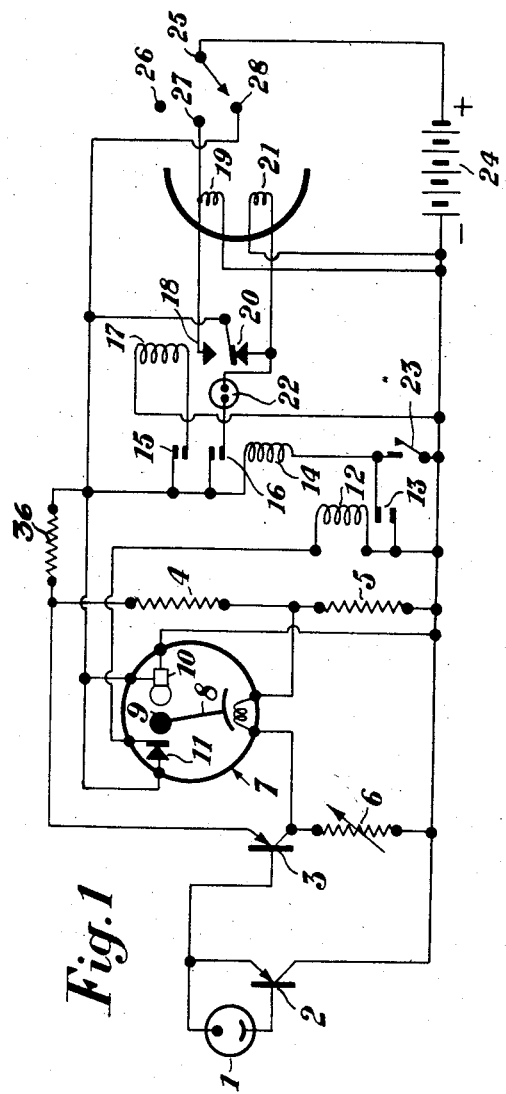
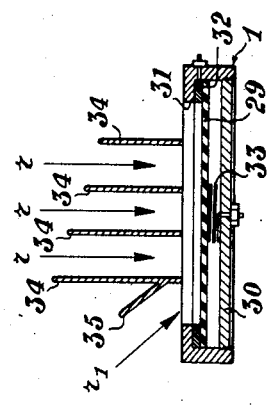
INVENTOR.
ANTONIO LO CELSO &
BY GIUSEPPE RIZZO
Wentworth, Lind & Ponack
Attys.

United States Patent Office 2,922,077
Patented Jan. 19, 1960

2,922,077

PHOTOELECTRIC DEVICES FOR SWITCHING THE DAZZLING HEADLIGHTS OF MOTOR-VEHICLES

Antonio Lo Celso and Giuseppe Rizzo, Gela, Italy

Application December 7, 1956, Serial No. 627,054

Claims priority, application Italy December 14, 1955

4 Claims. (Cl. 315—83)

The present invention relates to an improvement in photoelectric devices for switching the high beam headlights of motor vehicles.

Devices of this type have been developed which comprise in combination, a control unit including a photoelectric cell responsive to the high beam, a relay system energized by the signal produced by the photoelectric cell, and means controlled by said relay system causing the vehicle headlights to be switched from the high beam condition to the low beam condition, and simultaneously the operation of a blinking device, if said photoelectric cell is still hit by the high beam. The headlights are then left in their low beam condition throughout all of the period when no disturbing action occurs by the other vehicle.

One object of this invention is that of improving the operative conditions of these devices, by remarkably increasing the sensitivity of the control unit by a novel type of photoelectronic relay responsive to the signal produced by the photoelectric cell, said relay controlling the actual switching system.

Another purpose of this invention is that of so embodying the photoelectric cell that, when the two crossing vehicles are slightly spaced apart, it is not hit by the low beam coming from the crossing vehicle, so as to prevent the headlights from being switched again to their high beam condition before the actual crossing has occurred. At the moment of said crossing, however, the cell receives a flash from the low beam headlights of the crossing vehicle, sufficient to actuate the unit and to again switch the headlights to their high beam condition.

These and other objects of this invention will be evident from the following specification taken in connection with the attached drawings, in which:

Fig. 1 shows an electrical diagram of the device;
Fig. 2 is a cross-sectional view of the photoelectric cell, taken along a horizontal plane passing through the axis of said cell.

With reference to the drawing, the signal produced by the photoelectric cell 1 is amplified in a first transistor 2 and in a second transistor 3. The photo-electric micro-relay 7 is inserted as an indicator of phase displacement in a Wheatstone bridge. The Wheatstone bridge is formed of the resistors 4, 5 and 6, and the transistor 3 which represents the variable resistance of the bridge. Transistors 2 and 3 may be OC 71 transistors and resistors 4 and 5 may be 1500 ohm resistors. The micro-relay 7 may be a 30 microampere ammeter. Resistors 4 and 5 are fixed and the bridge is balanced by means of the adjustable resistor 6, e.g. of the value of 50,000 ohms, so as to zero set the micro-relay 7, while the photo-electric cell is kept completely covered. When photoelectric cell 1 receives a light ray it generates a current which is sent to the transistor 2 to which the photoelectric cell is connected. The transistor 2 amplifies the curent and applies it to the transistor 3 thus producing a variation in the impulse thereof with an ensuing phase difference in the bridge which displaces the pointer 8 of the micro-relay 7. Said photoelectronic micro-relay is comprised of an ammeter the pointer 8 of which is provided with a disc shaped end portion 9 sufficiently large to shut out the light beam delivered by a lamp 10 and extending towards the transistor 11. The lamp 10 may be a 12 volt lamp, and transistor 11 is an OC 71 transistor. The latter is so arranged that the light beam coming from the lamp 10 may hit, through the transparent covering wherefrom the protective varnish has been removed, the germanium surface. Thus, as soon as the pointer 8 of the micro-ammeter is moved, the transistor 11, hit by the light beam coming from the lamp 10, modifies its inner resistance and allows an amount of curent to pass, sufficient to energize the relay 12 in series with the transistor. Relay 12 may be a 5000 ohm relay with 1 milliampere absorption. When the contact 13 of this relay is closed, it energizes a second relay 14, which may have 800 ohms resistance, provided with a double set of contacts 15 and 16. The contact 15 actuates a snap relay 17 which controls the position of the contact 18 for the energization of the low beam filaments 9, and the contact 20 for the energization of the high beam filaments 21.

The contact 16 completes the circuit for a blinking device 22 which may, e.g., be a 50 watt blinking device. Independently from the action of the control unit formed by the photoelectric cell 1 and the micro-relay 7, the switching system for the headlights may be actuated by the push button 23. 24 denotes the power source which may be the conventional 6, 12 or 24 volt battery of the vehicle, the resistance 36 being 6000 ohms for a 12 volt battery; 25 denotes a switch which may be the one usually present on the instrument board of the car. This is a threeway switch which when it is on 26 energizes the parking lights, on 27 the low beam headlights and on 28 the high beam headlights, respectively.

Due to use of the photoelectronic micro-relay according to this invention, the sensitivity of the device is such as to ensure its operation at a distance of 600–700 meters, assuming the crossing vehicle is provided with conventional headlights.

The variable resistor 6 allows the micro-ammeter to be brought to zero in the simplest way, it being sufficient for this purpose to keep the photoelectric cell 1 in complete darkness.

The operation of the device is as follows. Assuming the power source 24 is connected to the circuit (and in the example depicted in the drawing this is obtained by moving the switch 25 onto the contact 28), if no light beam strikes the photoelectric cell 1, and if the snap relay 17 is on the contact 20, a circuit is completed from the positive side of the battery, through the contact 25, the contact 28, the contact 20 and the high beam filaments 21 which are thus energized. The relay 12 is de-energized, and also de-energized is the relay 14, so that the blinking device is inoperative.

In order to change to the low-beam headlights, the switch 25 is moved to the contact 27.

Assuming a motor car has the high beam headlights "on," and therefore the switch 25 is on the contact 28, as soon as the photoelectric cell 1 is hit by a light beam having a sufficient intensity (which occurs, as aforesaid, when a crossing vehicle is 600–700 m. away), the micro-relay 7 operates as described, the relay 12 is energized and a circuit is completed through the relay 14. As aforesaid, this energizes the relay 17 causing the headlights to be simultaneously changed from their high beam condition to their low beam condition, and contemporaneously a circuit is completed through the blinking device 22 so that the headlights of the crossing vehicle will observe a blinking light beam, until the photoelectric cell receives no light or a less intense light, i.e.

until the crossing vehicle, either automatically or voluntarily, has changed to its low beam headlights.

The photoelectric cell is so constructed that at the moment of the actual crossing, said cell receives the light of the low beam headlights of the other vehicle; this is sufficient to start operating the device, so as to obtain the snap change of the relay 17 to the contact 20 and the high beam headlights to be again energized. In this case the blinking device does not start operating.

If the driver of the crossing vehicle arbitrarily changes over to its high beam his dazzling headlights, his action causes a sequence of flashes from the high beam lights to be delivered from the vehicle, so that he is compelled to change over his headlights again. The change over occurs automatically in the situation where the crossing vehicle is provided with a device according to this invention. The same operation occurs if the headlights of the second or crossing vehicle have a greater intensity than those of the first vehicle.

As aforesaid, the push-button 23 allows the relay 14 to be operated independently from the control by the photoelectric cell. This means that the driver can at any moment change over his headlights without moving the switch 25 so as to leave the automatic device "on."

Due to the particular embodiment of the device according to this invention, said device is very easily mounted on a motor car; in fact, it will be sufficient to connect the low beam filaments to the contact 18 of the relay 17 and to insert the device between the contact 28 and the high beam filaments. This is accomplished by cutting the existing connection between the contact 28 and the filaments 21 and connecting the contact 28 to the positive line of the device according to this invention, and the filaments 21 to the contact 20 of the relay 17. The negative line of the device will be connected to the negative side of the battery.

As shown in Figure 2, the sensitive portion 29 of the photoelectric cell 1 is mounted in an opaque casing 30 provided with a front aperture 31 having an edge forming the stop member for said sensitive portion 29; a ring-shaped metallic insert 32 forms the negative terminal of the cell. The housing 30 is closed by a disc made of plastic material and the piece 29 is urged against the edge by a spring 33 which also forms the positive pole of the cell. In front of the aperture 31 are arranged the vanes 34, at right angles to the plane of the cell, vertically positioned with respect to the ground, and the length of which decreases from the left hand side to the right hand side as seen in Figure 2. Said vanes do not prevent longitudinal rays $r$ from striking the cell except that in the portion outside the vane 34 at the leftmost side of the unit, where a vane 35, inclined through about 40° wtih respect to the vane 34, leaves a passage only for the luminous rays $r1$ coming from the left at a great inclination, said rays being the lateral rays delivered by the lower beam of the crossing automobile. These rays cause the device to operate to restore the high beam headlights. Obviously the width of the space between the vane 35 and the edge 31 defines the mutual positions of the two cars when the high beam condition of the headlights is restored. This mutual positioning may be adjusted by the adjustment of both the extent and the inclination of the vane 35. Obviously, should the automobiles cross with their right hand sides toward each other, the arrangement of the vanes 34 and of the vane 35 would have to be reversed.

The unit may be mounted in front of the rear-vision mirror, which is usually fastened at the center of the upper cross-member of the windshield, thus presenting no obstacle to visibility from inside the car.

We claim:

1. A photoelectric device to be mounted on an automotive vehicle for switching from the high beam headlights thereof to the low beam headlights, which comprises in combination in an electric circuit a power source, a photoelectric cell positioned to receive light coming from an oncoming automotive vehicle moving in the opposite direction with respect to the automotive vehicle on which the device is mounted for transmitting an impulse when biased by said light, a first transistor connected to said photoelectric cell for receiving and amplifying said impulse, the positive pole of the cell being connected to the base of the said first transistor and the negative pole of the cell to the emitter of the said first transistor, a Wheatstone bridge in the said circuit having a second transistor, two fixed resistors and one adjustable resistor therein, said two fixed resistors being inserted in series between the negative pole of the power source and the emitter of the said second transistor, said adjustable resistor being connected at one end to the negative pole of the power source and at the other end to the collector of the said second transistor, said second transistor having the base connected to the emitter of the said first transistor and having the collector connected to one end of a current sensing means, the other end of the current sensing means being connected between said fixed resistors of the Wheatstone bridge, said second transistor being for receiving and further amplifying said impulse emitted by said photoelectric cell, said second transistor constituting a variable resistance in said bridge, a photoelectric micro-relay inserted in the said bridge and comprising a photo-transistor having the emitter connected to the positive pole of the power source and the base connected to the negative pole of the power source, a lamp connected to the positive and the negative pole of the power source, said photo-transistor being in the path of the light emitted by the said lamp and means actuated by the current in said current sensing means for shielding said lamp from said photo-transistor for allowing a passage of current only when the impulse of the said photoelectric cell enters the said bridge, a first relay outside of the said bridge and having a coil connected in series between the base of the said photo-transistor and the negative pole of the power source, said first relay having a contact one side of which is connected to the coil, a second relay having a coil connected at one end of the positive pole and with the other end to the negative pole of the power source through the contacts of the first relay, said second relay having two contacts associated therewith, one side of each of said contacts being connected to the coil of the second relay, a snap relay having a coil having one end connected to the other side of the first contact of the said second relay and the other end connected to the negative pole of the power source, said snap relay having a first contact and a second contact, and a blinking device operatively connected from said second contact of said snap relay to the other side of said second contact of the two contacts of the second relay, a low beam headlight circuit and a high beam headlight circuit each connected to the negative pole of the power source and comprising low beam and a high beam filament respectively, said filaments being connected respectively to the said first and second contact of the said snap relay, a switch having one end connected to the positive pole of the power source and having two switching contacts, the first contact being connected to the said snap relay and the second to said low beam filament.

2. A device as claimed in claim 1 in which said photo transistor has a portion of the protective varnish on the side thereof facing the said lamp removed and wherein said means actuated by the current in said current sensing means comprises an ammeter provided with a pointer having a disc shaped expansion on the end thereof, said disc shaped expansion being between said lamp and said photo transistor to shut out the light beam coming from the said lamp when said photoelectric cell is inoperative and permitting the passage of the light beam from the said lamp to the said photo transistor when the photoelectric cell transmits an impulse.

3. A device as claimed in claim 1, in which said photoelectric cell comprises an opaque casing having a front wall border delimiting a central aperture in the said casing, a sensitive material covering said aperture, a metallic ring between said sensitive material and said border and forming the negative terminal of the cell, a disc of plastic material forming the rear wall of the casing, a spring interposed between said disc and said sensitive material and urging said sensitive material against the said metallic ring, said spring forming the positive terminal of the photoelectric cell, a plurality of vanes located in front of the said central aperture and extending perpendicularly to said sensitive material, said vanes having a length which decreases from one side to the other of the casing, a further vane fastened to the longest one of the said plurality of vanes and positioned to intercept the passage of the light beams perpendicular to the said sensitive material and to permit the passage toward the sensitive material of an inclined light beam coming laterally of the photoelectric cell from an automotive vehicle passing the automotive vehicle whereon the device is mounted.

4. A device as claimed in claim 1 further comprising a push button inserted in the electric circuit and connected between said second relay coil and the negative pole of said power source for hand operating said snap relay independently of the operation of the photoelectric cell.

References Cited in the file of this patent

UNITED STATES PATENTS

| | | |
|---|---|---|
| 2,550,610 | Smith | Apr. 24, 1951 |
| 2,612,817 | Wilcox | Oct. 7, 1952 |
| 2,624,825 | Crowley | Jan. 6, 1953 |
| 2,759,124 | Willis | Aug. 14, 1956 |
| 2,773,219 | Aron | Dec. 4, 1956 |
| 2,773,220 | Aron | Dec. 4, 1956 |
| 2,786,964 | De Witt | Mar. 26, 1957 |

OTHER REFERENCES

Penfield: Radio and Television News, pp. 56–57, August 1955.